United States Patent
Cupitt et al.

(10) Patent No.: US 8,860,728 B2
(45) Date of Patent: Oct. 14, 2014

(54) APPARATUS AND METHOD FOR PROVIDING AND POSITIONING ADDITIONAL CONTEXT FOR A PROCESS VARIABLE IN A GRAPHICAL DISPLAY OF AN INDUSTRIAL HUMAN MACHINE INTERFACE

(75) Inventors: David J. Cupitt, North Narrabeen (AU); Graeme Laycock, Hunters Hill (AU); Stephen Coorey, Strathfield (AU)

(73) Assignee: Honeywell International Inc., Morristown, NJ (US)

( * ) Notice: Subject to any disclaimer, the term of this patent is extended or adjusted under 35 U.S.C. 154(b) by 1192 days.

(21) Appl. No.: 12/754,446

(22) Filed: Apr. 5, 2010

(65) Prior Publication Data

US 2011/0242111 A1  Oct. 6, 2011

(51) Int. Cl.
*G06T 11/00* (2006.01)

(52) U.S. Cl.
CPC .................................... *G06T 11/003* (2013.01)
USPC ........................................................ 345/470

(58) Field of Classification Search
USPC .................................................. 345/636, 637
See application file for complete search history.

(56) References Cited

U.S. PATENT DOCUMENTS

| | | | |
|---|---|---|---|
| 5,428,733 A * | 6/1995 | Carr | 715/809 |
| 5,943,236 A | 8/1999 | Ohno et al. | |
| 6,760,048 B1 * | 7/2004 | Bates et al. | 715/797 |
| 7,024,626 B2 * | 4/2006 | Ko | 715/715 |
| 7,249,326 B2 | 7/2007 | Stoakley et al. | |
| 8,169,643 B2 * | 5/2012 | Yamada | 358/1.15 |
| 2008/0077844 A1 | 3/2008 | Kim et al. | |
| 2009/0132954 A1 | 5/2009 | Cupitt | |
| 2009/0249205 A1 | 10/2009 | Yoshimura et al. | |
| 2011/0115816 A1 * | 5/2011 | Brackney | 345/629 |

FOREIGN PATENT DOCUMENTS

JP 4347779 A 12/1992

OTHER PUBLICATIONS

Notification of Transmittal of the International Search Report and the Written Opinion of the International Searching Authority, or the Declaration dated Oct. 6, 2011 in connectio with International Patent Application No. PCT/US2011/029290.
"Experion PKS with PMD Controller HMIWeb Technology User Interface", Honeywell International Inc., Mar. 2008, 5 pages.

* cited by examiner

*Primary Examiner* — Kee M Tung
*Assistant Examiner* — Frank Chen (57) ABSTRACT

A method includes receiving a trigger to present a balloon notification on a display. The notification is associated with an object in the display. The method also includes determining dimensions of the notification and determining a suitable location in the display for the notification. The method further includes presenting the notification in the display at the suitable location. Determining the suitable location in the display for the notification could include (i) determining whether the notification if placed proximate to a first corner of the object would be presented completely in the display, (ii) determining how many other objects in the display would be obstructed by the notification if placed proximate to the first corner of the object, and/or (iii) determining how much total area of other objects in the display would be obstructed by the notification if placed proximate to the first corner of the object.

20 Claims, 4 Drawing Sheets

APPARATUS AND METHOD FOR PROVIDING AND POSITIONING ADDITIONAL CONTEXT FOR A PROCESS VARIABLE IN A GRAPHICAL DISPLAY OF AN INDUSTRIAL HUMAN MACHINE INTERFACE

TECHNICAL FIELD

This disclosure relates generally to process control systems. More specifically, this disclosure relates to an apparatus and method for providing and positioning additional context for a process variable in a graphical display of an industrial human machine interface.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

In conventional process control systems, human-machine interface (HMI) applications are used to generate graphical displays, which provide content associated with the industrial processes being monitored. The HMI applications ideally provide human operators with a continuous view of the processes being monitored. This may be done using process graphics that contain numerical and graphic elements representing variables and parameters of the processes being monitored and controlled. This may allow, for example, the human operators to ensure proper operation of the processes and to identify and resolve any problems that arise.

In general, a graphical process display may contain many different graphical elements in an overview representation of a process. In such cases, the amount of detailed information that can be displayed for any specific process variable may be limited.

SUMMARY

This disclosure provides an apparatus and method for providing and positioning additional context for a process variable in a graphical display of an industrial human machine interface.

In a first embodiment, a method includes receiving a trigger to present a balloon notification on a display of a human-machine interface (HMI). The balloon notification is associated with an object in the display. The method also includes determining dimensions of the balloon notification and determining a suitable location in the display for the balloon notification. The method further includes presenting the balloon notification in the display at the suitable location.

In a second embodiment, an apparatus includes a memory configured to store information defining a graphical display. The apparatus also includes at least one processor configured to receive a trigger to present a balloon notification in the display. The balloon notification is associated with an object in the display. The at least one processor is also configured to determine dimensions of the balloon notification, determine a suitable location in the display for the balloon notification, and present the balloon notification in the display at the suitable location.

In a third embodiment, a computer readable medium embodies a computer program. The computer program includes computer readable program code for receiving a trigger to present a balloon notification on a display of a human-machine interface (HMI), where the balloon notification is associated with an object in the display. The computer program also includes computer readable program code for determining dimensions of the balloon notification, determining a suitable location in the display for the balloon notification, and presenting the balloon notification in the display at the suitable location.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
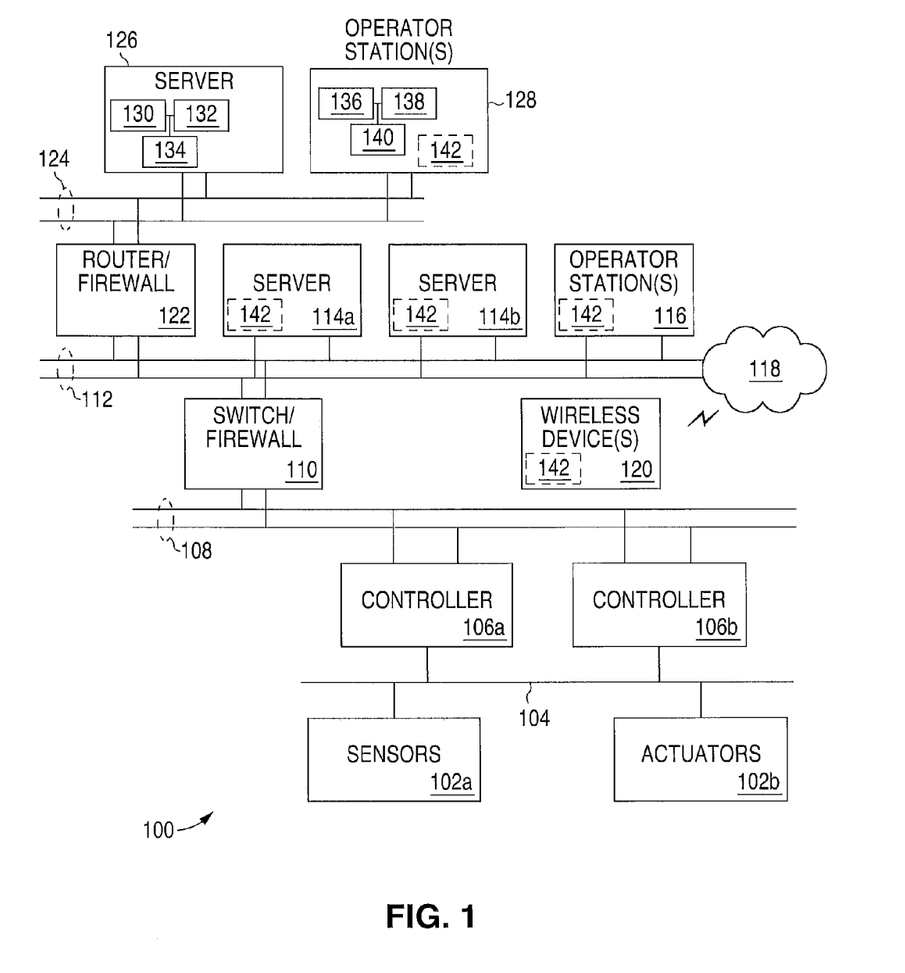
FIG. 1 illustrates an example process control system according to this disclosure.
Figure 2A:
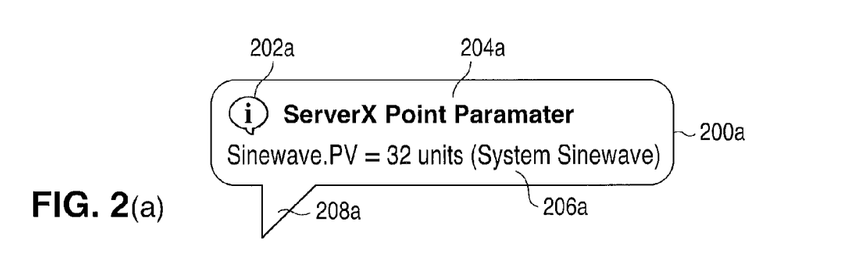
FIG. 2 illustrates example types of balloon notifications according to this disclosure.
Figure 2B:
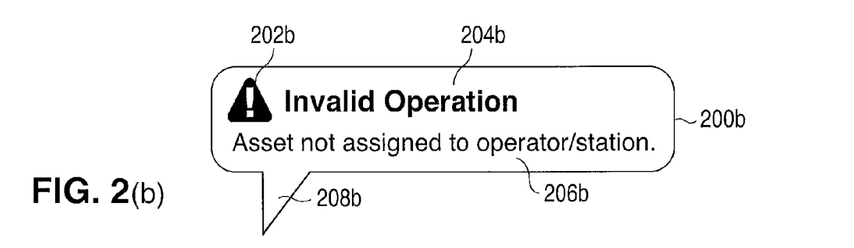
Figure 2C:
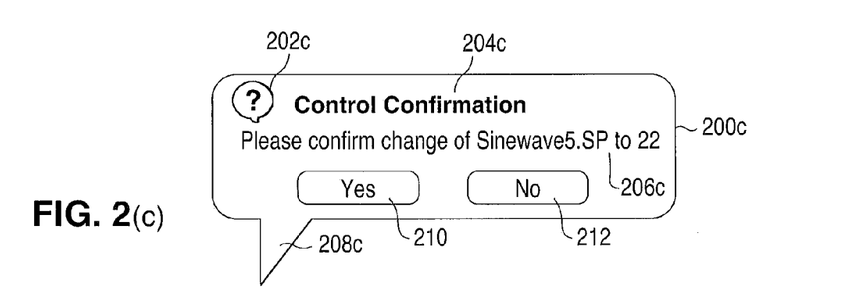
Figure 2D:
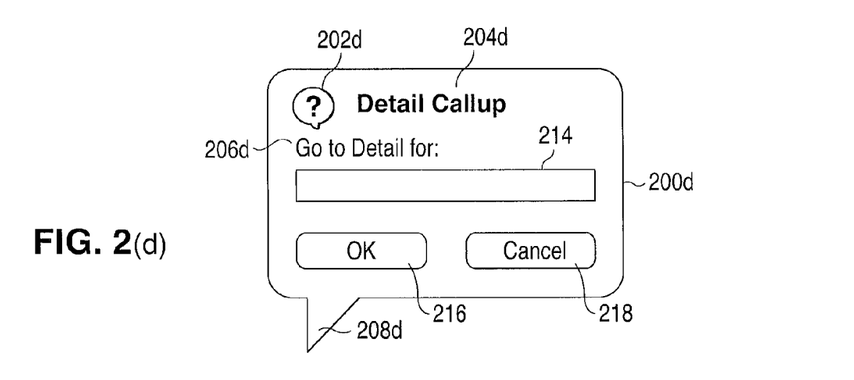

FIG. 1 illustrates an example process control system 100 according to this disclosure. The embodiment of the process control system 100 shown in FIG. 1 is for illustration only. Other embodiments of the process control system 100 may be used without departing from the scope of this disclosure.

In this example embodiment, the process control system 100 includes various components that facilitate production or processing of at least one product or other material, such as one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system, such as heaters, motors, catalytic crackers, or valves. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting conditions in a process system. Also, a process system may generally represent any system or portion thereof configured to process one or more products or other materials in some manner.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network, a pneumatic control signal network, or any other or additional type(s) of network(s).

Two controllers 106a-106b are coupled to the network 104. The controllers 106a-106b may, among other things, use the measurements from the sensors 102a to control the operation of the actuators 102b. For example, the controllers 106a-106b could receive measurement data from the sensors 102a and use the measurement data to generate control signals for the actuators 102b. Each of the controllers 106a-106b includes any hardware, software, firmware, or combination thereof for interacting with the sensors 102a and controlling the actuators 102b. The controllers 106a-106b could, for example, represent multivariable controllers or other types of controllers. As a particular example, each of the controllers 106a-106b could represent a computing device running a MICROSOFT WINDOWS operating system.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

Two servers 114a-114b are coupled to the networks 112. The servers 114a-114b perform various functions to support the operation and control of the controllers 106a-106b, sensors 102a, and actuators 102b. For example, the servers 114a-114b could log information collected or generated by the controllers 106a-106b, such as measurement data from the sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any hardware, software, firmware, or combination thereof for providing access to, control of, or operations related to the controllers 106a-106b. Each of the servers 114a-114b could, for example, represent a computing device running a MICROSOFT WINDOWS operating system.

One or more operator stations 116 are coupled to the networks 112. The operator stations 116 represent computing or communication devices providing user access to the servers 114a-114b, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the servers 114a-114b. The operator stations 116 could also allow the users to adjust the operation of the sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any hardware, software, firmware, or combination thereof for supporting user access and control of the system 100. Each of the operator stations 116 could, for example, represent a computing device running a MICROSOFT WINDOWS operating system.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any hardware, software, firmware, or combination thereof for controlling the overall operation of the system 100.

One or more operator stations 128 are coupled to the networks 124. The operator stations 128 represent computing or communication devices providing, for example, user access to the servers 114a-114b, 126. Each of the operator stations 128 includes any hardware, software, firmware, or combination thereof for supporting user access and control of the system 100. Each of the operator stations 128 could, for example, represent a computing device running a MICROSOFT WINDOWS operating system.

In particular embodiments, the various servers and operator stations may represent computing devices. For example, each of the servers 114a-114b, 126 could include one or more processors 130 and one or more memories 132 for storing instructions and data used, generated, or collected by the processor(s) 130. Each of the servers 114a-114b, 126 could also include at least one network interface 134, such as one or more Ethernet interfaces. Also, each of the operator stations 116, 128 could include one or more processors 136 and one or more memories 138 for storing instructions and data used, generated, or collected by the processor(s) 136. Each of the operator stations 116, 128 could also include at least one network interface 140, such as one or more Ethernet interfaces.

In one aspect of operation, one or more of the operator stations, wireless devices, servers, or other devices include or have access to a human-machine interface (HMI) application 142. An HMI application 142 generates graphical displays that present content visually representing one or more processes (or portions thereof) being monitored and/or controlled. Each HMI application 142 includes any suitable hardware, software, firmware, or combination thereof for generating one or more graphical displays representing at least part of a process being monitored and/or controlled. As a particular example, the HMI application 142 could use HMIWEB technology from HONEYWELL INTERNATIONAL INC. The HMIWEB technology uses hypertext markup language (HTML) and allows users to build process control displays (web pages) that are loaded onto operator stations 116, 128. The HTML displays may use INTERNET EXPLORER or other browser technology to extend the functionality of the web pages to allow process information to be displayed and to allow operators to control processes via the web pages.

HMI applications (such as HMI application 142) are used to generate graphical displays, which can provide content associated with processes and controls that are used by an operator. Because the amount of detailed information able to be displayed at one time for any specific process or control variable may be limited, additional information about the variable may need to be presented on the display as needed or requested. For ease of explanation, such additional information is referred to as a message.

Messages may be in different forms and have different contents. For example, a message may be an information message, a security message, an error message, or a prompt/response message. A prompt/response message typically requires some type of response from the operator, such as a selection of either "yes" or "no" or an input of a value or text.

In order for a message to be more beneficial to an operator, the message could meet the following requirements:
- the message can be displayed so as to minimize the amount of obstruction of other content in the display;
- the message may not prevent the operator from performing normal activities;
- since many process control systems include multiple monitors or displays, the message can be readily visible in the local area in which the operator is currently working;
- the operator can be able to easily identify which control the message is referencing; and
- the message can comply with abnormal situation management guidelines.

Current message display mechanisms typically fail to meet all of these requirements. For example, some typical message display mechanisms place all messages in a single status line, usually near the top or bottom of the display window. Since every message appears in the same location, it may not be obvious to an operator which control the message is referencing or is associated with. Additionally, if the operator is focused on a control in another part of the display or on a second display, the operator may not readily notice a message appearing in a status line that is a distance away from the operator's attention.

In accordance with this disclosure, the HMI application 142 can support functionality for providing and positioning additional context for a process variable in a graphical display. For example, the HMI application 142 can display messages as balloon notifications. A balloon notification or simply a "balloon" is a graphical window (possibly elliptical, rectangular, or otherwise elongated) with a tail pointing to a source. The use of this functionality is described in greater detail below.

Although FIG. 1 illustrates one example of a process control system 100, various changes may be made to FIG. 1. For example, a control system could include any number of sensors, actuators, controllers, servers, operator stations, networks, wireless networks, and wireless devices. Also, the makeup and arrangement of the process control system 100 in FIG. 1 is for illustration only. Components could be added, omitted, combined, or placed in any other suitable configuration according to particular needs.

FIG. 2 illustrates example types of balloon notifications 200a-200d according to this disclosure. The embodiments of the balloon notifications 200a-200d shown in FIG. 2 are for illustration only. Other types of balloon notifications may be used without departing from the scope of this disclosure.

As shown in FIG. 2, the balloon notifications 200a-200d include icons 202a-202d, message headers 204a-204d, content sections 206a-206d, and tails 208a-208d, respectively. Each of the balloon notifications 200a-200d may be configured to support any type of message. For example, an information balloon notification 200a displays an information message to inform an operator about a particular control or condition. In some embodiments, the content section 206a of the information balloon notification 200a contains only text. The text may include one or multiple lines and may word wrap if necessary. The icon 202a is an information icon indicating the information message type.

A security/error balloon notification 200b displays a security or error message that is usually of a higher priority than information messages. In some embodiments, the content section 206b of the security/error balloon notification 200b contains only text. The text may include one or multiple lines and may word wrap if necessary. The icon 202b is an exclamation icon indicating the security/error message type.

A yes/no prompt balloon notification 200c displays a message that requires a "yes" or "no" response from an operator. The balloon notification 200c includes the content section 206c, a "Yes" button 210, and a "No" button 212. Text in the content section 206c may include one or multiple lines and may word wrap if necessary. The operator may respond to the notification 200c by clicking either the button 210 or the button 212. The icon 202c is a question mark icon indicating the prompt message type.

An input prompt balloon notification 200d displays a message that requests an input from the operator. The input prompt balloon notification 200d includes the content section 206d, an input window 214, an "OK" button 216, and a "Cancel" button 218. Text in the content section 206d may include one or multiple lines and may word wrap if necessary. The operator may respond to the message in the input prompt balloon notification 200d by entering text into the input window 214 and clicking the "OK" button 216. Alternatively, the operator may respond by clicking the "Cancel" button 218. The icon 202d is a question mark icon indicating the prompt message type.

Although FIG. 2 illustrates examples of four types of balloon notifications, various changes may be made to the balloon notifications in FIG. 2. For example, the icon, message header, and content section of each balloon notification 200a-200d are for illustration only. Other icons, message headers, and content sections in any suitable layout or format could be used. Also, other balloon types displaying other types of messages and/or having other types of buttons or other controls could be used.

Figure 3:
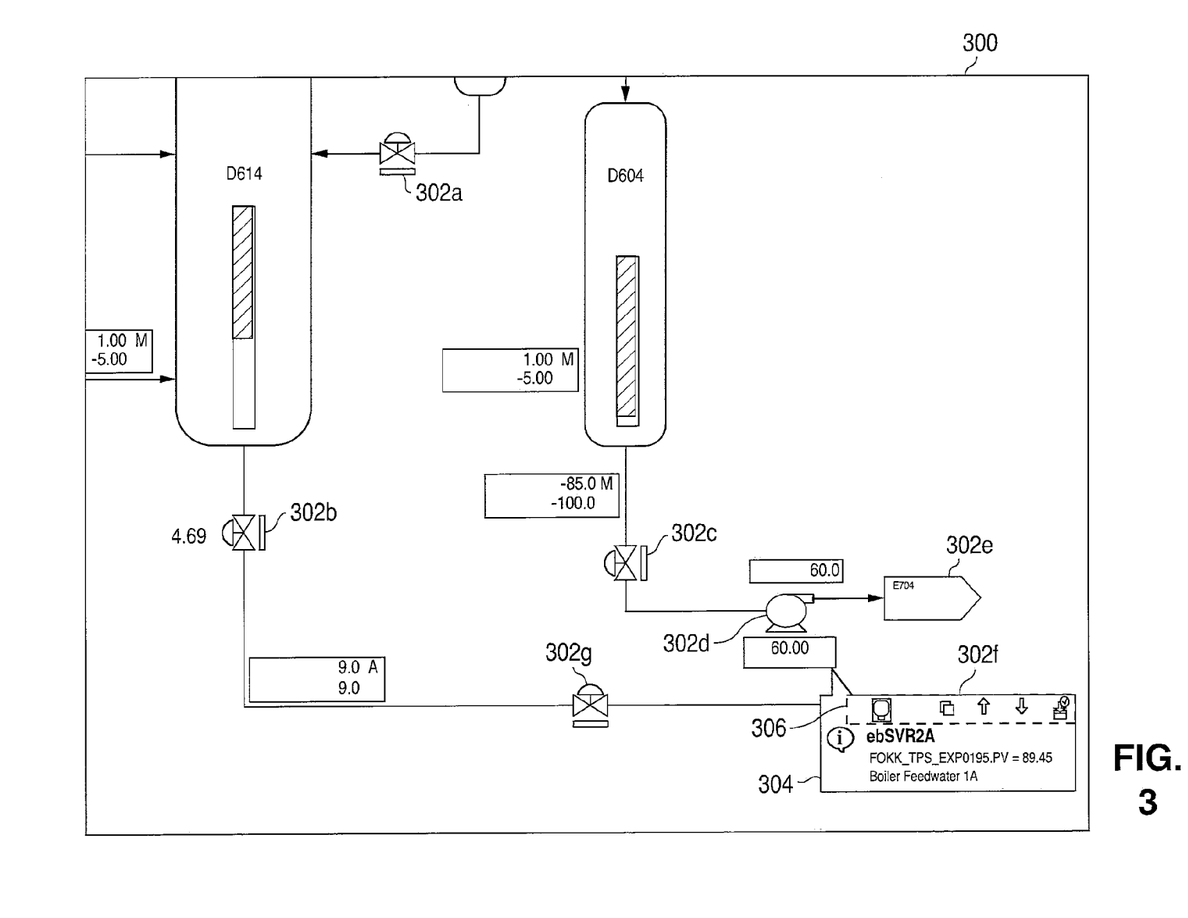
FIG. 3 illustrates an example HMI application display including a balloon notification according to this disclosure.

FIG. 3 illustrates an example HMI application display 300 including a balloon notification according to this disclosure. The embodiment of the HMI application display 300 shown in FIG. 3 is for illustration only. Other embodiments of the HMI application display 300 could be used without departing from the scope of this disclosure. Also, for ease of explanation, the HMI application display 300 of FIG. 3 could be generated by the HMI application 142 in the process control system 100 of FIG. 1. The HMI application display 300 could be used with any other suitable device or system.

As shown in FIG. 3, the HMI application display 300 includes multiple objects 302a-302g that visually represent components of one or more processes and/or controls, such as sensors 102a, actuators 102b, and controllers 106a-106b in FIG. 1. For example, the objects 302a-302c and 302g represent valves, the object 302d represents a boiler feedwater control, and the objects 302e-302f represent outputs. In this example, the boiler feedwater control 302d is associated with a balloon notification ("balloon") 304. The balloon 304 is an information balloon that displays an informational message about the boiler feedwater control 302d.

The balloon 304 is similar to the information balloon 200a seen in FIG. 2. The balloon 304 also includes a group of icons 306 that are not shown in information balloon 200a. From left to right, the icons 306 include an alarm icon to indicate that the boiler feedwater control 302d is in an alarm status, an Associated Display icon to initiate an associated display window for the boiler feedwater control 302d, up and down arrows to raise and lower a value of the boiler feedwater control 302d, and an Acknowledge Alarm icon. In certain embodiments, each one of the icons 306 may be standard or optional depending on the balloon type and context.

In some embodiments, the balloon 304 is placed at or near the object of the message, wherever possible. The "object" associated with the message refers to the component of the process or control associated with the message. In this example, the balloon 304 can be displayed close to the boiler feedwater control 302d. The tail of the balloon 304 points substantially toward the boiler feedwater control 302d, thus further informing the operator where to direct his or her attention. In other embodiments, each balloon may appear at a predefined global message position.

A balloon can be placed appropriately to ensure that the entire balloon is visible on the display. In some embodiments, this can occur regardless of where the related object is located on the display or the screen resolution. To facilitate placement of the balloon 304, the balloon's tail can be placed at any position around the balloon. For example, the tail of the balloon 304 is located near the top left corner of the balloon 304 in FIG. 3. However, the tail of the balloon 304 could be located at any other corner or any other position around the perimeter of the balloon 304 to ensure ideal placement of the balloon 304.

In some embodiments, a default position for the balloon is hanging off the bottom right corner of the related object. In FIG. 3, the balloon 304 is positioned off the bottom right corner of the boiler feedwater control 302d. If placement of the balloon at this default location would cause some or all of the balloon to be off the screen (and therefore not visible), other corners of the object can be examined to see whether placement of the balloon off those corners would result in a completely visible balloon.

Once corners that permit a completely visible balloon have been identified, the number of displayed objects obstructed by the balloon for each corner position is determined. For example, the balloon 304 partially obstructs the control 302e: If the balloon 304 were displayed off a different corner of the boiler feedwater control 302d, the balloon 304 might obstruct some or all of the controls 302c, 302e, or 302g. The union (or sum) of the areas of all obstructed objects is also determined.

The decision as to which corner is the most suitable location to display the balloon can be made using a combination of object count and area obstructed. If two or more corners are equally suitable for display of the balloon, one of those corners may be selected in any suitable manner, such as based on a predetermined "pecking order" of the corners. In some embodiments, if none of the four corners is deemed suitable (e.g., if the number and/or area of obstructed objects on each corner exceeds a specified threshold), the balloon may be placed in an area of the display that provides minimal obstruction of other objects, even if the area is somewhat distant from the related object. In such a case, the balloon may be attached to the related object via an extended tail.

A balloon may be displayed on the display for a finite period of time. For example, in some embodiments, the balloon 304 may disappear from the HMI application display 300 automatically after a specified time period. The time period may be set, for example, by a system administrator or by the operator. A shorter time period can limit obfuscation of the underlying display, while a longer time period can promote awareness of the balloon 304 by the operator. In other embodiments, the balloon 304 may disappear after an action by the operator. For example, the balloon 304 may close when clicked on or otherwise selected by the operator.

In some embodiments, only one balloon may be displayed at any time on the display 300. Having only one balloon displayed at a time helps to ensure that the operator's attention is focused on that balloon. Accordingly, if more than one balloon needs to be displayed (e.g., two or more controls have simultaneous alerts or one control has both an information message and a message requiring an input), the balloons may be prioritized and displayed in priority order. For example, error message balloons may have a higher priority than information balloons. Thus, the higher priority error message balloon may be displayed first. Once the operator has responded to the error message balloon, the error message balloon disappears, and the lower priority information balloon is displayed. In other embodiments, multiple balloons can be presented on the display 300 simultaneously.

Messages that are not related to a particular control or contextual operation may still appear in a message zone (e.g., a status line) of HMI application display 300. For example, the message "invalid point references in the display" may not be specific to any element or control on the display. Accordingly, this message might not appear in a balloon, but rather in a specified message zone (such as at the top or bottom of the display 300).

In some embodiments, the use of balloons may be configurable. This could allow, for example, an operator to decide to use a standard message zone notification method or the new balloon notification method. This may be a configuration setting on a per station basis or on a system wide basis.

Certain style characteristics of the balloons may also be configurable, either by the operator or by the system administrator. For example, a balloon's background color, text color, shading, transparency, and icons may be configurable. Likewise, balloons may display in the language of the operator's choice. Default values for any or all of these characteristics may be determined at system setup.

In some embodiments, balloons may support access to documentation that helps the operator to understand and use the notification method or the specific contents of the balloons. The balloons may also incorporate security features to limit actions by unauthorized personnel. For example, a balloon 304 may only display when the operator is an authorized user (such as a user with a certain security level who is allowed to modify the system).

In addition, in some embodiments, balloons containing context information about a control may appear when prompted by the operator. For example, when the operator selects the boiler feedwater control 302d with a mouse click, the balloon 304 or a similar balloon can be displayed. A condensed view of the context may be presented to the user when the mouse cursor hovers over an object in the display 300. The context balloon may not appear immediately but rather after the mouse cursor has hovered over the object for a longer time period (e.g., longer than a second).

Although FIG. 3 illustrates one example of an HMI application display 300 including a balloon notification, various changes may be made to FIG. 3. For example, the HMI application display 300 could include any number of objects for representing and monitoring one or more processes and/or controls.

Figure 4:
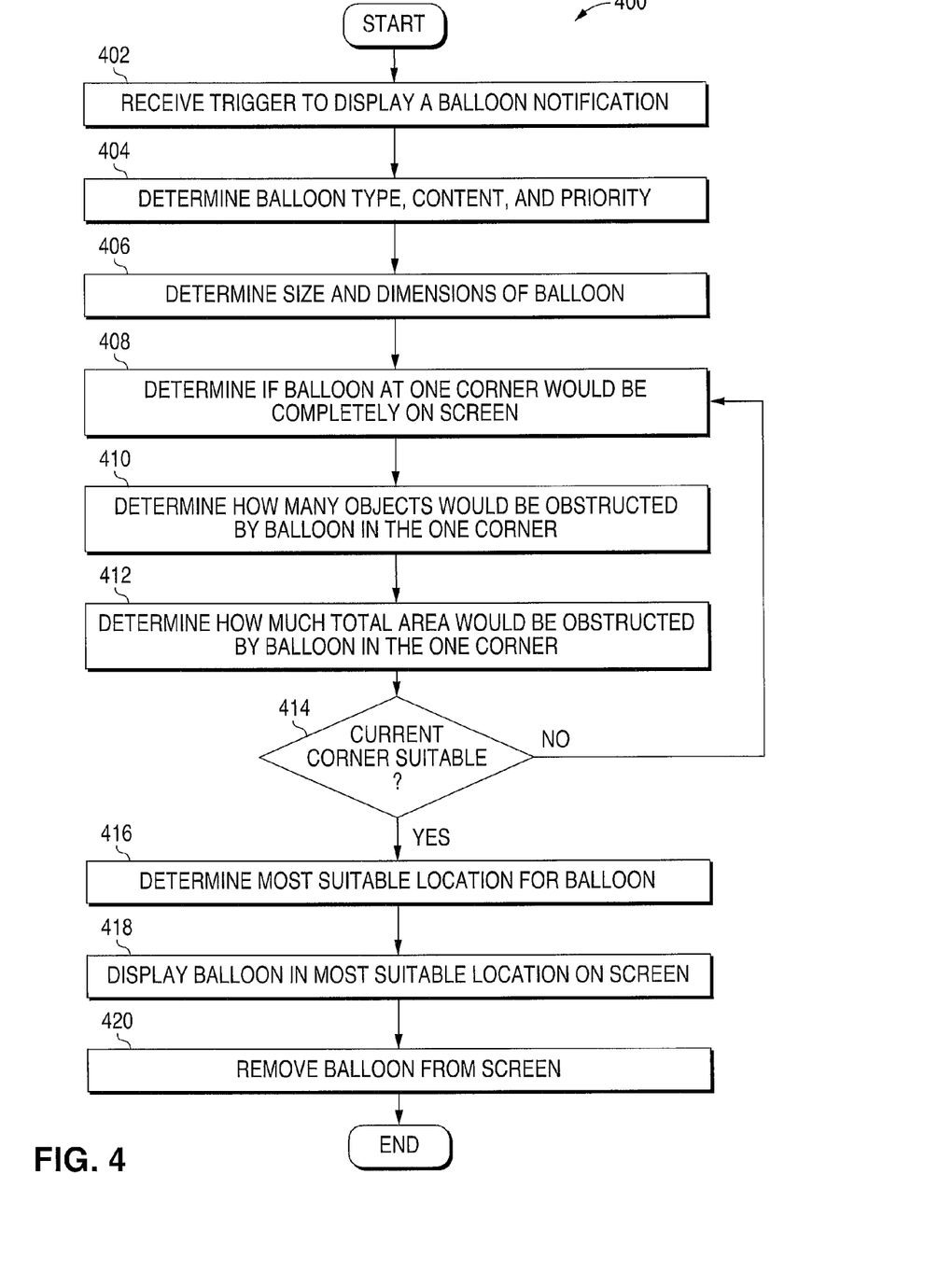
FIG. 4 illustrates an example method for displaying balloon notification messages in an HMI application according to this disclosure.

FIG. 4 illustrates an example method 400 for displaying balloon notification messages in an HMI application according to this disclosure. The embodiment of the method 400 shown in FIG. 4 is for illustration only. Other embodiments of the method 400 could be used without departing from the scope of this disclosure. Also, for ease of explanation, the method 400 of FIG. 4 is described with respect to the HMI application display 300 of FIG. 3 executing on an operator station in the process control system 100 of FIG. 1. The method 400 could be used with any suitable application, device, or system.

A trigger to display a balloon notification is received at step 402. For example, the boiler feedwater control 302d may experience a change in value of an operating parameter, thereby triggering an informational or alert message in a balloon. As another example, an operator could click on or hover over the boiler feedwater control 302d, thus triggering the display of a particular message regarding the control 302d.

A balloon type, content, and priority of the balloon are determined at step 404. For example, the HMI application display 300 may determine that an information balloon containing the text "ebSVR2A FOKK_TPS_EXP0195.PV=89.45 Boiler Feedwater 1A" is to be displayed for the control 302d. The message may be assigned a lower priority to ensure that it is displayed after any higher priority message that may be required at approximately the same time.

A size and dimensions of the balloon are determined at step 406. For example, the size of the balloon 304 can be determined based on the message, font size, and placement of icon(s). If the balloon 304 includes any input windows and/or buttons, those windows and/or buttons can also affect the size and dimensions of the balloon 304.

A series of steps to determine the placement of the balloon is executed at steps 408-14. Starting at one corner of the associated object, it is determined if a balloon placed off that corner would be completely on the screen of the display at step 408. It is determined how many other objects, if any, on the display would be obstructed by a balloon in that position at step 410. It is determined how much total area, if any, of other objects would be obstructed by a balloon in that position at step 412.

If the current corner of the object is not a suitable location for the balloon (i.e., the balloon would not be completely displayed on the screen and/or would obstruct all or part of one or more other objects), the method returns to step 408 to examine another corner of the object. This may continue until all corners of the object are examined. Otherwise, the most suitable location for the balloon is determined at step 416. If only one corner of the object is examined and that corner is found to be suitable, that location may be considered the most suitable location. If multiple corners of the object are examined, the most suitable location may be determined by examining which corner would result in a balloon that is completely displayed on the screen and that obstructs the fewest other objects and/or the least amount of object area.

The balloon is displayed in the most suitable location at step 418. For example, the balloon 304 in FIG. 3 is displayed off the bottom right corner of the control 302d. After a period of time, the balloon disappears from the display at step 420. For example, the balloon 304 may disappear from the HMI application display 300 automatically after a specified time period or when selected by the operator.

Although FIG. 4 illustrates one example of a method 400 for displaying balloon notification messages in an HMI application, various changes may be made to FIG. 4. For example, while shown as a series of steps, various steps in FIG. 4 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving a trigger to present a balloon notification on a display of a human-machine interface (HMI), the display comprising a graphical schematic representation of a process control system, the balloon notification associated with an object in the display, the object indicating an equipment control or sensor in the process control system;
determining dimensions of the balloon notification;
determining a suitable location in the display for the balloon notification, the determined location based on the equipment control or sensor associated with the balloon notification, wherein determining the suitable location comprises:
for each of first, second, third, and fourth corners of the object:

determining whether the balloon notification if placed proximate to that corner of the object would be presented completely in the display;
determining how many other objects in the display would be obstructed by the balloon notification if placed proximate to that corner of the object; and
determining how much total area of other objects in the display would be obstructed by the balloon notification if placed proximate to that corner of the object; and
selecting the corner that is completely displayed on the screen and that obstructs a fewest number of other objects and a least amount of object area;
presenting the balloon notification in the display at the suitable location, the balloon notification comprising a value adjustment icon configured to raise or lower a value of a parameter of the equipment control or sensor in the process control system, an input window configured to accept a text input associated with the equipment control or sensor from an operator, and a confirmation button that can be actuated by the operator to confirm the text input; and
changing the parameter of the equipment control or sensor in response to the operator actuating the value adjustment icon or the confirmation button.

2. The method of claim 1, further comprising:
determining a balloon notification type; and
determining a balloon notification priority.

3. The method of claim 1, further comprising:
receiving an indication from the operator to remove the balloon notification from the display; and
removing the balloon notification from the display.

4. The method of claim 1, wherein the balloon notification further comprises a display icon configured to initiate an associated display window for the equipment control.

5. The method of claim 1, wherein the equipment control or sensor comprises a boiler control or a feedwater control.

6. The method of claim 1, further comprising:
presenting a second notification at a location unrelated to any of the objects in the display.

7. The method of claim 1, further comprising:
removing the balloon notification from the display after receiving a selection from the operator.

8. An apparatus comprising:
at least one memory configured to store information defining a graphical display comprising a schematic representation of a process control system; and
at least one processor configured to:
receive a trigger to present a balloon notification in the display, the balloon notification associated with an object in the display, the object indicating an equipment control or sensor in the process control system;
determine dimensions of the balloon notification;
determine a suitable location in the display for the balloon notification, the determined location based on the equipment control or sensor associated with the balloon notification, wherein the at least one processor is configured to determine the suitable location by:
for each of first, second, third, and fourth corners of the object:
determining whether the balloon notification if placed proximate to that corner of the object would be presented completely in the display;
determining how many other objects in the display would be obstructed by the balloon notification if placed proximate to that corner of the object; and
determining how much total area of other objects in the display would be obstructed by the balloon notification if placed proximate to that corner of the object; and
selecting the corner that is completely displayed on the screen and that obstructs a fewest number of other objects and a least amount of object area;
present the balloon notification in the display at the suitable location, the balloon notification comprising a value adjustment icon configured to raise or lower a value of a parameter of the equipment control or sensor in the process control system, an input window configured to accept a text input associated with the equipment control or sensor from an operator, and a confirmation button that can be actuated by the operator to confirm the text input; and
change the parameter of the equipment control or sensor in response to the operator actuating the value adjustment icon or the confirmation button.

9. The apparatus of claim 8, wherein the at least one processor is further configured to:
determine a balloon notification type; and
determine a balloon notification priority.

10. The apparatus of claim 8, wherein the at least one processor is further configured to:
receive an indication from the operator to remove the balloon notification from the display; and
remove the balloon notification from the display.

11. The apparatus of claim 8, wherein the balloon notification further comprises a display icon configured to initiate an associated display window for the equipment control.

12. The apparatus of claim 8, wherein the equipment control or sensor comprises a boiler control or a feedwater control.

13. The apparatus of claim 8, wherein the at least one processor is further configured to:
present a second notification at a location unrelated to any of the objects in the display.

14. The apparatus of claim 8, wherein the at least one processor is further configured to:
remove the balloon notification from the display after receiving a selection from the operator.

15. A non-transitory computer readable medium encoded with a computer program, the computer program comprising computer readable program code for:
receiving a trigger to present a balloon notification on a display of a human-machine interface (HMI), the display comprising a graphical schematic representation of a process control system, the balloon notification associated with an object in the display, the object indicating an equipment control or sensor in the process control system;
determining dimensions of the balloon notification;
determining a suitable location in the display for the balloon notification, the determined location based on the equipment control or sensor associated with the balloon notification, wherein determining the suitable location comprises:
for each of first, second, third, and fourth corners of the object:
determining whether the balloon notification if placed proximate to that corner of the object would be presented completely in the display;
determining how many other objects in the display would be obstructed by the balloon notification if placed proximate to that corner of the object; and
determining how much total area of other objects in the display would be obstructed by the balloon notification if placed proximate to that corner of the object; and selecting the corner that is completely displayed on the screen and that obstructs a fewest number of other objects and a least amount of object area;

presenting the balloon notification in the display at the suitable location, the balloon notification comprising a value adjustment icon configured to raise or lower a value of a parameter of the equipment control or sensor in the process control system, an input window configured to accept a text input associated with the equipment control or sensor from an operator, and a confirmation button that can be actuated by the operator to confirm the text input; and changing the parameter of the equipment control or sensor in response to the operator actuating the value adjustment icon or the confirmation button.

16. The non-transitory computer readable medium of claim 15, wherein the computer program further comprises computer readable program code for:

presenting a second notification at a location unrelated to any of the objects in the display.

17. The non-transitory computer readable medium of claim 15, wherein the computer program further comprises computer readable program code for:

receiving an indication from the operator to remove the balloon notification from the display; and removing the balloon notification from the display.

18. The non-transitory computer readable medium of claim 15, wherein the computer program further comprises computer readable program code for:

determining a balloon notification type; and determining a balloon notification priority.

19. The non-transitory computer readable medium of claim 15, wherein the equipment control or sensor comprises a boiler control or a feedwater control.

20. The non-transitory computer readable medium of claim 15, wherein the computer program further comprises computer readable program code for:

removing the balloon notification from the display after receiving a selection from the operator.

* * * * *